United States Patent

Coccagna

[15] 3,646,455
[45] Feb. 29, 1972

[54] PHASE-DETECTING CIRCUIT

[72] Inventor: Edmund G. Coccagna, Villanova, Pa.
[73] Assignee: Mohawk Data Sciences Corporation, Herkimer, N.Y.
[22] Filed: Oct. 8, 1970
[21] Appl. No.: 79,232

[52] U.S. Cl. ..........................328/133, 307/295, 324/83 D, 328/109
[51] Int. Cl. ..........................................................H03d 13/00
[58] Field of Search ..........................328/109, 133, 141, 155; 307/232, 295; 324/83 D; 329/103, 107

[56] References Cited

UNITED STATES PATENTS

| 3,205,438 | 9/1965 | Buck | 328/133 X |
| 3,328,688 | 6/1967 | Brooks | 328/133 X |
| 3,200,340 | 8/1965 | Dunne | 307/232 X |
| 3,430,148 | 2/1969 | Miki | 307/232 X |
| 3,435,424 | 3/1969 | Schira et al. | 328/109 X |

Primary Examiner—Stanley T. Krawczewicz
Attorney—Francis J. Thomas, Richard H. Smith, Thomas C. Siekman and Sughrue, Rothwell, Mion, Zinn and Macpeak

[57] ABSTRACT

A circuit for detecting which of two out-of-phase input signals is leading (or lagging) the other. The detecting circuit includes a first circuit which is bistable for certain periods of time, the state of this circuit during each such period being dependent on which signal is leading. A timing pulse is provided during each such period and fed to a bistable circuit which provides the output signal of the detecting circuit. The bistable circuit is adapted to respond to the state of the first circuit in response to the timing pulses and, thereby, provides an output signal indicative of which of the two input signals is leading or lagging.

6 Claims, 4 Drawing Figs.

INVENTOR.
EDMUND G. COCCAGNA
BY
ATTORNEY

3,646,455

PHASE-DETECTING CIRCUIT

BACKGROUND OF THE INVENTION

This invention relates to logic circuits and, more particularly, to a phase-detecting logic circuit for providing a digital output signal indicative of which of two out-of-phase input signals is leading the other.

Such a circuit is useful in numerous environments, e.g., in the demodulating circuit disclosed and claimed in a patent application Ser. No. 79,103, filed Oct. 8, 1970, executed on Oct. 1, 1970 by the inventor of the instant application, titled Demodulating Circuit and Method, and assigned to the assignee of the instant application.

SUMMARY OF THE INVENTION

Accordingly, it is the primary object of this invention to provide such a phase-detecting circuit which is simple, inexpensive and reliable.

According to the invention, a circuit for detecting which of two out-of-phase input signals is leading the other comprises a first circuit which is bistable for certain periods of time and means for providing an output signal indicative of the state of the first circuit during such periods. The state of the first circuit during such periods is dependent of which input signal is then leading. Preferably, the output signal providing means includes means for providing first timing pulses during such periods of time and a bistable circuit adapted to respond to the state of the first circuit in response to the timing pulses.

If it is desired to detect the leading input signal at intervals more frequent than those at which such periods occur, there is provided a second circuit which is bistable for additional periods of time, the state of this second circuit during such additional periods being dependent on which input signal is leading at those times. Second timing pulses are provided during the additional periods and the bistable circuit for providing the output signal is adapted to respond to the state of the second circuit in response to the second timing pulses as well as the state of the first circuit in response to the first timing pulses.

Where the input signals each comprise a series of digital pulses with the pulses of one signal corresponding to the pulses of the other signal and corresponding pulses overlapping in time so that each pulse is received by the detecting circuit concurrently with part of its corresponding pulse in the other input signal, the first timing pulses are preferably generated in response to the leading edges of the pulses in the input signal which is then lagging. The second timing pulses are preferably generated in response to the lagging edges of the pulses in the signal which is then lagging.

DESCRIPTION OF THE PREFERRED EMBODIMENTS

Figure 1:
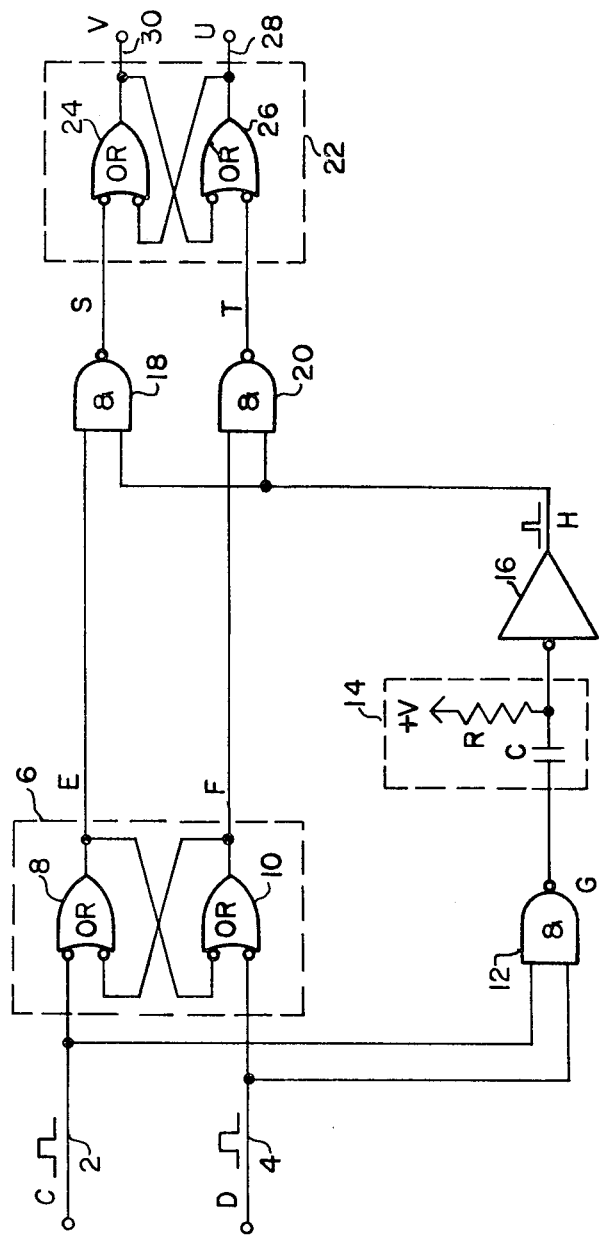
FIG. 1 is a schematic logic diagram of a preferred embodiment of the invention.
Figure 3:
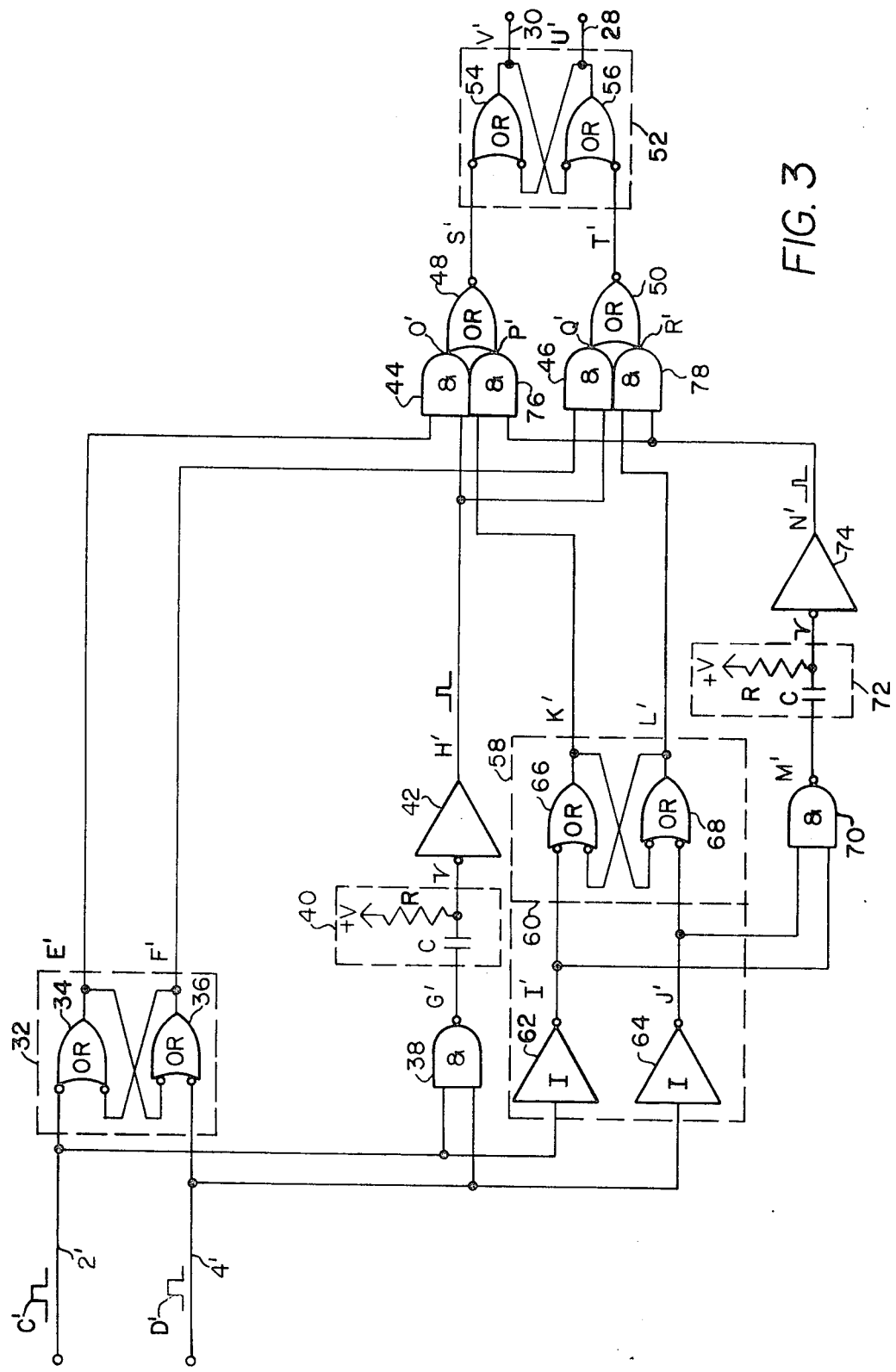
FIG. 3 is a schematic diagram of a second preferred embodiment of the invention.

FIGS. 1 and 3 are logic circuit diagrams whose circuit symbols are in accordance with MIL-STD-806B standard approved by the Department of Defense, effective Feb. 26, 1962. It is to be understood that the logic circuit symbols of these Figures operate in a conventional manner wherein the inputs to the circuits and the outputs therefrom always exist at either of two discrete voltage levels, the high (or positive) voltage level of the digital system or the lower (or negative) voltage level of the system.

In accordance with the standard, a circuit for performing an AND function is represented by a D-shaped block containing the "&" symbol. The input lines are always connected to the straight side of the block and the output line is always connected to the curved side of the block. The function of the AND circuit is to provide a high output voltage only when all input lines exist at the high level. When a small circle appears at the point where the output line joins the block, the function of the circuit is to provide a low-level voltage output only when all inputs are at the high level.

A circuit for performing the logical OR function is represented by an arrow-shaped block containing the symbol "OR." The function of the OR circuit is to provide a high-level output only when any one or more of the input lines is at the high level. When a small circle appears at the point where the output line joins the block, then the function of the circuit is to provide a low-level output only when one or more input lines is at the high level. Conversely, when small circles appear where the input lines join the block, the function of the circuit is to provide a high-level output only when any one or more of the input lines is at the low level.

An inverter circuit is represented by a triangular block containing the symbol "I" and having a small circle at the point where either the input line or the output line joins the block. The function of this circuit is to provide an output level which is always opposite the input level.

Figure 2:
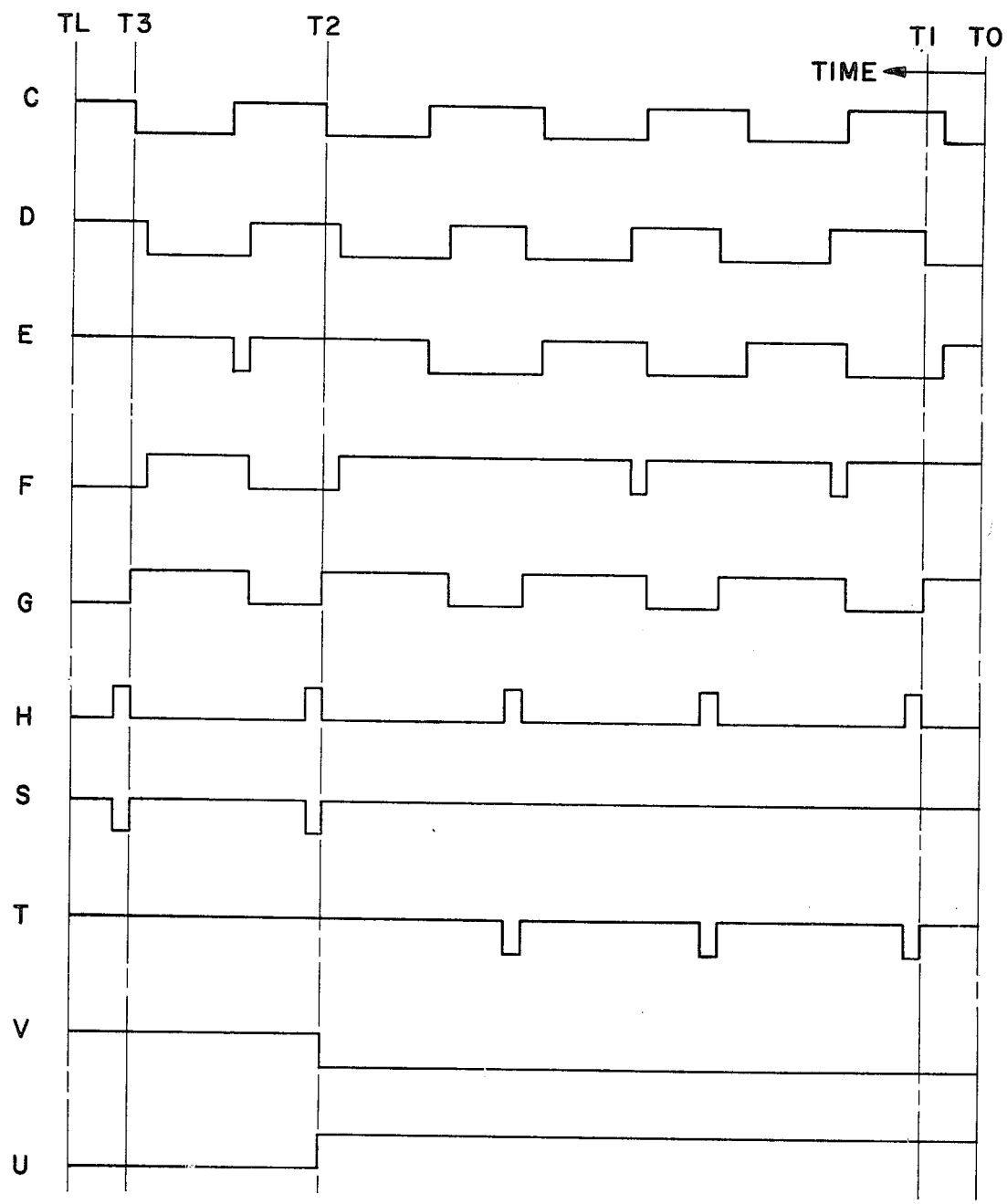
FIG. 2 is a waveform diagram illustrating with an example the operation of the preferred embodiment shown in FIG. 1.

Referring to the preferred embodiment of the phase-detecting circuit shown in FIG. 1, input signals C and D, whose phase relationship (i.e., which signal lags or leads) is to be detected by the circuit, are received on input leads 2 and 4 respectively. As illustrated in FIG. 2, both input signals C and D comprise a series of positive digital pulses. Each pulses in each signal corresponds to a pulse in the other signal but either lags or leads its corresponding pulse depending on which input signal is lagging or leading at that particular time.

As shown in FIG. 1, the input signals C and D are fed to a first circuit 6 which comprises a pair of OR gates, 8 and 10. In addition, the C and D signals are fed to a two-input AND-gate 12. AND gate 12 is activated to provide a low signal at its output G when the signals at both its inputs are high. That is, the AND gate's output G will be low whenever pulses concurrently occur in the C and D signals. Because the phase differences between the C and D signals allow their corresponding pulses to overlap (i.e., each pulse is received concurrently with part of its corresponding pulse in the other signal), this condition occurs at the leading edge of each pulse in the signal which is lagging at that time.

When activated, AND-gate 12 provides a high-to-low transition at its output G. This transition is detected by a differentiating circuit 14 containing a capacitor C and resistor R connected to a positive voltage such that quiescently the output of circuit 14 is at the high voltage. In response to the high-to-low transition, the differentiating circuit 14 feeds a negative spike to a shaper 16.

The shaper 16 converts the spike to a square wave pulse at its output H. As illustrated by the small circle at the shaper's input, the shaper provides an output signal opposite to its inputs. Thus, in response to the negative spike from the differentiating circuit 14, the shaper's square wave output pulse is positive. This pulse is used for timing purposes.

The OR-gate 8 in circuit 6 receives as one of its inputs the C signal on input lead 2. Additionally, OR-gate 10 in circuit 6 receives as one of its inputs the signal D on input lead 4. These two OR gates are arranged such that the circuit 6 has certain bistable properties at certain separated periods of time. That is, during these periods, the E output of circuit 6 will be positive with its F output negative or the F output will be positive with the E output negative.

FIG. 2 illustrates the operation of the circuit of FIG. 1 when receiving typical C and D signals between a time T O and a later time T L. As shown in FIG. 2, the circuit 6 exhibits such bistable properties each time a digital pulse is generated at the output H of shaper 16. For example, at time T 1 in FIG. 2, the E output of circuit 6 is negative with the F output positive. However, at time T 3, the F output of circuit 6 is negative with the E output positive. The time periods during which circuit 6 acts bistable and within which pulses are generated by shaper 16 at H each begin when the circuit receives the leading edge of a pulse in the signal which is then lagging and end when the lagging edge of the corresponding pulse in the leading signal is received.

As also illustrated in FIG. 2, each time a pulse is generated at H, the circuit 6 is in a state indicative of which of the signals, C or D, is leading. For example, at time T 1, the signal C is leading signal D and the E output of circuit 6 is negative with its F output positive. At time T 3, with signal C lagging signal D, the E output of circuit 6 is positive with its F output negative.

AND-gates 18 and 20 are provided to gate the signals from the outputs E and F respectively of circuit 6 with the timing pulses generated at H. AND-gates 18 and 20 provide low signals when activated by high inputs. The low outputs of AND-gates 18 and 20 are fed to inputs S and T respectively of a circuit 22.

The circuit 22 is identical with circuit 6 having OR-gates 24 and 26 arranged so that the circuit has certain bistable properties. As illustrated in FIG. 2, the circuit 20 always acts in a bistable manner within the phase-detecting circuit shown in FIG. 1. Whenever its U output is positive its V output is negative and, conversely, whenever its V output is positive its U output is negative. The output of this circuit provides the digital output signals from the phase-detecting circuit of FIG. 1 and indicates which of the signals, C or D, is leading. Its U output is positive with its V output negative when C leads D and, conversely, its U output is negative with its V output positive whenever D is leading.

Thus, the U and V outputs of circuit 22 provide the output signals of the phase-detecting circuit by indicating which input signal is leading. These outputs are fed over output leads 28 and 30.

Therefore, within the preferred embodiment of FIG. 1, the first circuit 6 is bistable from each period beginning when it receives the leading edge of a pulse in the signal which is then lagging and ending when it receives the lagging edge of the corresponding pulse in the leading signal. During these periods, a timing signal is generated at H to gate the outputs, E and F of circuit 6 through AND-gate 18 and 20. The outputs of AND-gates 18 and 20 are fed to the S and T inputs of a bistable circuit 22 whose outputs provide the output signal of the phase-detecting circuit indicating which of the input signals is leading.

FIG. 3 shows a preferred embodiment of the phase-detecting circuit which is able to respond more quickly than the circuit of FIG. 1 in response to a change in phase relationship between the input signals, i.e., where the leading input signal begins to lag.

Figure 4:
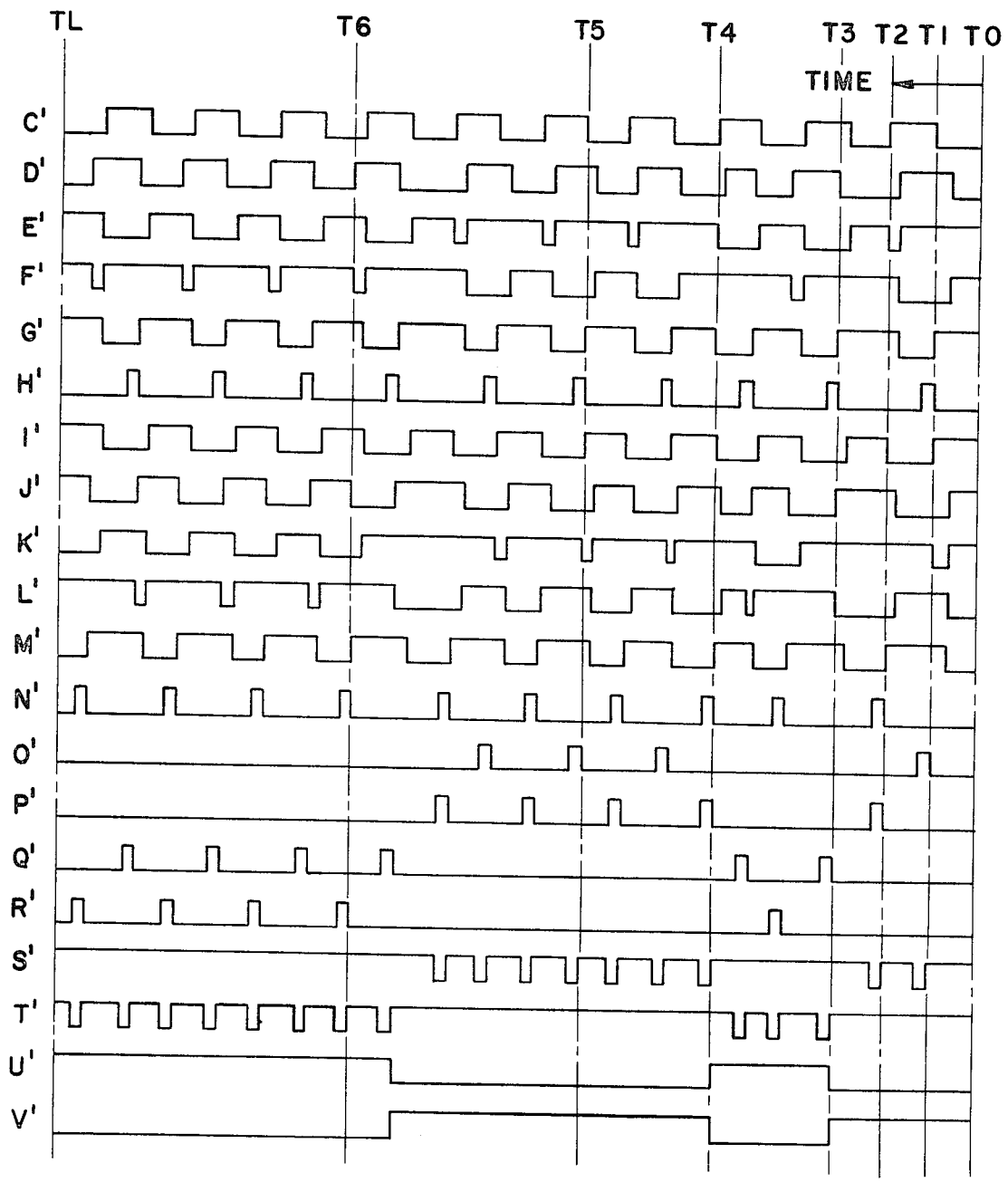
FIG. 4 is a waveform diagram illustrating with an example the operation of the preferred embodiment shown in FIG. 3.

Many of the elements in FIG. 3 correspond to elements in FIG. 1 and are given the same reference numerals or letters but are primed. FIG. 4 illustrates the operation of the elements in FIG. 3 with typical C' and D' signals received between time T 0 and a later time T L. Similar to the C and D signals described in FIGS. 1 and 2, both the C' and D' signals comprise a series of positive digital pulses with each pulse corresponding to and overlapping one in the other signal.

Referring to FIG. 3, the input signals C' and D' are fed on leads 2' and 4' to the phase-detecting circuit as inputs to a circuit 32 having two OR gates, 34 and 36. OR-gate 34 receives the C' signal and OR-gate 36 receives the D' signal. The signals C' and D' are also fed to a two-input AND-gate 38 which provides a low signal at its output G' when both signals C' and D' are high, i.e., when the positive pulses in C' and D' overlap. This will occur at the leading edge of a pulse in the lagging signal.

A differentiating circuit 40 similar to circuit 14 in FIG. 1 and comprising a resistor R and capacitor C is connected to the output of AND-gate 38. When AND-gate 38 is activated it provides a high-to-low transition at G'. The differentiating circuit 40 detects this transition and applies a negative spike to the input of shaper 42.

The shaper 42 converts the spike into a digital square wave pulse at its output H'. As seen from the small circle at its input, the shaper also provides an output signal which is opposite to its input and, therefore, the square wave at H' is positive while the spike at the shaper's input is negative. Each such square pulse is utilized for timing purposes.

As seen from FIG. 4, OR-gates 34 and 36 in circuit 32 are arranged such that the circuit 32 is bistable at each time such a timing pulse is generated. That is, each time a pulse appears at H', one of the circuit's outputs, E' or F', will be positive and its other output negative. The timing pulses occur in response to the leading edges of pulses in the signal, C' or D', which is lagging at that time. The circuit 32 is bistable for each period occuring between the time it receives such a leading edge of a pulse in the signal which is then lagging and the time it receives the lagging edge of the corresponding overlapping pulse in the signal which is then leading.

As illustrated at time T 3 in FIG. 4, the voltage at the E' output is negative with that at the F' output positive during a timing pulse at H' when the signal C' leads the signal D'. As illustrated at time T 5 in FIG. 4, when the signal C' lags signal D', the voltage at E' is positive with that at F' negative when a timing pulse occurs at H'. Thus, the circuit 32 is bistable each time a timing pulse appears at the output H' of shaper 42 and the state of the circuit 32 at such times is dependent on whether the signal C' leads D' or vice versa.

AND-gates 44 and 46 are provided to gate the two outputs of the circuit 32 with the timing pulses generated at H'. AND-gate 44 receives the signal from the E' output of circuit 32 and the timing pulses from the shaper 42 and, when these two signals are high, provides a high voltage at its output O'.

AND-gate 46 receives as its inputs the signal from the F' output of circuit 32 and the timing pulses. AND-gate 46 provides a positive voltage at its output Q' in response to high voltages at its inputs.

The output voltages of AND-gates 44 and 46 are fed via OR-gates 48 and 50 to the inputs, S' and T', of a circuit 52 which comprises two OR-gates 54 and 56. The circuit 52 is identical with the circuit 32 and thus has certain bistable properties. Its outputs, U' and V', are applied to output leads 30' and 28' respectively.

OR-gate 48 provides a low level signal at the S' input of circuit 52 in response to a high signal at the O' output of AND-gate 44 while OR-gate 50 provides a low level signal at the T' input of circuit 52 in response to a high level signal at the Q' output of AND-gate 46.

As illustrated by FIG. 4, circuit 52 always acts in a bistable manner. Whenever a positive signal appears at its U' output a negative signal appears at its V' output. Conversely, a positive voltage at its V' output always appears with a negative voltage at its U' output. As also illustrated in FIG. 4, the voltage at its U output goes from negative to positive in response to a negative-going transition at its T' input provided a positive voltage appears at its S' input. Also, the voltage at its U' output goes from positive to negative in response to a negative-going transition at its S' input if a positive voltage appears at its T' input.

The transitions at S' and T' may be initiated by outputs from AND-gates 44 and 46 which of course, are enabled by the timing pulses from shaper 42. As shown in FIG. 4, at Time T 3, such a timing pulse initiates the first transition in the output of bistable circuit 52. All of the circuit elements of FIG. 3 above described have corresponding elements in the embodiment of FIG. 1. The output signal on leads U and V, or U' and V', are able to respond to a change in the phase relationships between the input signals at the generation of each timing pulse H, or H'. If it is desirable to detect the phase relationships at more frequent intervals, additional circuitry is required as described below.

As shown in FIG. 3, the signals C' and D' are fed to a second circuit 58 as well as to the circuit 32. Circuit 58 includes a circuit 60 identical with the circuit 32 and having two OR gates, 66 and 68. However, it also includes a pair of inverters 62 and 64. Inverter 62 receives the signal C' on lead 2', inverts it, and feeds it to AND-gate 66. The inverter 64 receives the signal D' on lead 41, inverts it, and feeds it to the OR-gate 68.

The signals from the output I' of inverter 62 and the output J' of inverter 64 are also fed to an AND-gate 70. AND-gate 70 provides a high-to-low transition at its output M' in response to the lagging edge of a pulse in the lagging one of the C' or D' signals. It feeds its output to a second differentiating circuit 72 which detects this transition and feeds a negative spike to shaper 74 in response. AND-gate 70, differentiating circuit 72 and the shaper 74 are identical with AND-gate 38, differentiating circuit 40 and the shaper 42. They provide positive timing pulses at the output N' of shaper 74 similar to the timing pulses generated at the output H' of shaper 42. As shown in FIG. 4, the timing pulses from H' and N' occur in an alternating sequence.

The circuit 58 has its output at K' and L' and is bistable for certain separated periods of time. As illustrated in FIG. 4, each such period occurs between the time the circuit 58 receives the lagging edge of a pulse in the signal, C' or D' which is then lagging and the leading edge of the next occurring pulse in either of the signals.

As also illustrated in FIG. 4, a timing pulse is generated at N' during each of these periods. When the C' signal leads the D' signal, the K' output of circuit 58 is negative while its L' output is positive for its bistable period. When the D' signal leads the C' signal, the K' output of circuit 58 is positive and its L' output negative. The former situation is illustrated at time T 6, in FIG. 4 and the latter at time T 4.

The timing pulses from N' gate the signals from the outputs K' and L' of the circuit 58 through AND-gates 76 and 78. The outputs of these AND gates are also fed to OR-gates 48 and 50. AND-gates 76 and 78 perform a function identical with the function of AND-gates 44 and 46 except that they pass signals dependent on the state of circuit 58 at each timing pulse generated at N'. As noted above, AND-gates 44 and 46 pass signals representative of the state of circuit 32 upon the occurrence of each timing pulse H'.

Thus, the circuit 58 and the timing pulses generated at N' are used to change the state of the output bistable circuit 52 as is required. As an example, in FIG. 4, at Time T 4 the output U' of bistable circuit 52 makes a positive-to-negative transition and the circuit's V' output makes a negative to positive transition in response to the occurrence of a timing pulse generated at N'.

The operation of the circuit in FIG. 3 will now be described with respect to the illustrative C' and D' signals shown in FIG. 4.

Referring to both the phase-detecting circuit shown in FIG. 3 and to the waveforms in FIG. 4, the signals C' and D' are fed to circuit 32 and AND-gate 38. At time T 1, AND-gate 38 provides a negative transition at its output G' in response to the leading edge of the first pulse in the then-lagging signal C'. This negative-going transition is converted to a negative spike by the differentiating circuit 40 and thereafter to a positive square wave pulse at H' by the inverting shaper 42. Upon the occurrence of this timing signal at H' at time T 1, circuit 32 is providing a positive voltage at its E' output and a negative voltage at its F' output. With these outputs circuit 32 indicates that signal D' leads C' at T 1. The timing pulse is fed to AND-gates 44 and 46 to gate the signals from the E' and F' outputs respectively of the circuit 32. The outputs of AND-gates 44 and 46 at O' and Q' are fed (via OR-gates 48 and 50) to the S' and T' inputs of bistable circuit 52 which provides a high signal at its V' output and a low signal at its U' output since the Q' output of AND-gate 46 is low causing a high signal to be applied to the T' input of circuit 52. The high signal at the V' output of circuit 52 and low signal of its U' output are fed over leads 30' and 28' to indicate that at Time T 1, signal D' leads signal C'.

The signals C' and D' are also fed to inverters 62 and 64 in circuit 58. The signals from the outputs I' and J' of inverters 62 and 64 are fed to AND-gate 70. AND-gate 70 provides a negative-going transition at its output M' at time T 2 in response to the trailing edge of the first pulse in signal C' which is lagging signal D'. A positive timing pulse is generated at the output N' of shaper 74 in response to this transition at M'.

The outputs from inverters 62 and 64 are also fed to the circuit 60. As illustrated in FIG. 4, at time T 2, the K' output of circuit 58 is positive with its L' output negative. In this manner, circuit 58 indicates that signal C' is lagging D' at T 2. These outputs are gated through AND-gates 76 and 78 with the timing pulse generated at N'. The outputs of AND-gates 76 and 78 are fed via OR-gates 48 and 50 to the S' and T' inputs of the circuit 52 in a similar manner as are the outputs of AND-gates 44 and 46. At this time, T 2, the outputs of AND-gates 76 and 78 cause a high signal at the T 1 input to the circuit 52 and thus circuit 52 continues to provide a negative signal at its U' output and a positive one at its V' output. This, of course, indicates that at Time T 2 signal C still lags signal D.

At Time T 3, a leading signal C' and lagging signal D' are fed to the phase-detecting circuit in FIG. 3. A timing pulse occurs at H' in response to the leading edge of a pulse in a lagging signal D'. At this time the circuit 32 has its E' output negative and its F' output positive. Because signal C is now leading, the state of circuit 32 is opposite to what it was at the time T 1 of the previous timing pulse at H when the C signal lagged. The negative signal from the E' output and the positive one from the F' output of circuit 32 are gated through AND-gates 44 and 46 with the timing pulse. In response, AND-gate 44 continues to provide a low signal at its output O'. However, AND-gate 46 provides a negative to positive transition at its output Q'. This causes a positive to negative transition to occur at the T' input of circuit 52 and thus changes the state of the circuit. The U' output becomes positive while simultaneously the V' output goes negative. These outputs are fed over leads 30' and 28' to indicate that at time T 3 the signal C leads signal D.

The state of circuit 48 remains stable while this condition continues.

At time T 4 the signal C again lags signal D as they are applied to the phase-detecting circuit. This condition is detected as shown in FIG. 4 by the phase-detecting circuit of FIG. 3 which provides a high signal on lead 30' (the V' output of circuit 52) and a low signal on lead 28' (the U' output of the circuit 52).

At this time, T4, a timing pulse at N' is generated in response to the lagging edge of a pulse in signal C' and a positive voltage appears at the K' output and a negative voltage at the L' output of circuit 58. These outputs are gated with the timing pulse N' through AND-gates 76 and 78. The output signals of these AND gates at P' and R' are fed to the S' and T' inputs of the circuit 52 via OR-gates 48 and 50. This does not cause any change in the signal at input T' but effects a negative-going transition at the S' input which changes the state of the circuit 52. The signal at the U' output of circuit 52, goes negative, while that at its V' input, positive. Thus, as the signals C and D change their phase relationship so that signal C which previously was leading becomes the lagging signal, the state of circuit 52 changes to indicate this.

Subsequently C again changes from the lagging to the leading signal and this is indicated by the outputs U' and V'.

In summary, the phase-detecting circuit includes at least one circuit which is bistable for certain separated periods of time, the state of the circuit during these periods depending on which of the signals, C or D (or C' or D') is leading. During each period when the circuit is bistable, a timing pulse is provided to gate the circuit's output to an output circuit, the state of which indicates the leading signal. Only one such periodic bistable circuit is provided in the embodiment of FIG. 1 while two bistable circuits are provided in the embodiment of FIG. 3. Thus, the output circuit in FIG. 3 is able to respond quicker to a change in the phase relationship between the input signals.

It will be appreciated that various changes in the form and details of the above-described preferred embodiment may be effected by persons of ordinary skill without departing from the true spirit and scope of the invention.

I claim:

1. A circuit for detecting which of two out-of-phase signals is leading the other, said circuit comprising:
   a. first circuit means for receiving said signals, said first circuit means being bistable for first periods of time while receiving said signals, the state of said first circuit during said first periods being dependent on which of said signals is leading;
   b. second circuit means for receiving said signals, said second circuit means being bistable for second periods of time while receiving said signals, the state of said second circuit means during said second periods being dependent on which of said signals is leading;
   c. means for providing a first timing pulse during each of said first periods;
   d. means for providing a second timing pulse during each of said second periods; and
   e. bistable circuit means connected to said first and second circuit means and adapted to receive said first and second timing pulses, said bistable circuit means being adapted to respond to the state of said first circuit means in response to each of said first timing pulses, said bistable circuit means also being adapted to respond to the state of said second circuit means in response to each of said second timing pulses, whereby said bistable circuit means indicates the state of said first circuit means during said first periods and the state of said second circuit means during said second periods.

2. A circuit for detecting which of two out-of-phase signals is lea;ing the other wherein said signals each comprise a series of digital pulses with each pulse in one of said signals being received concurrently with part of a corresponding pulse in the other of said signals, said circuit comprising:
   a. first circuit means for receiving said signals, said first circuit means being bistable for first periods of time after receiving the leading edges of the pulses in the lagging one of said signals, the state of said first circuit means during said first periods being dependent on which of said signals is leading;
   b. means for receiving said signals and providing first timing pulses in response to the leading edges of the pulses in the lagging one of said signals; and
   c. bistable circuit means connected to said first circuit means and adapted to receive said first timing pulses, said bistable circuit means being adapted to respond to the state of said first circuit means in response to each of said first timing pulses, whereby said bistable circuit means provides an output signal indicative of the state of said first circuit means during said first periods.

3. The circuit as recited in claim 2 wherein said first circuit means is bistable for each period beginning when it receives the leading edge of one of the pulses in the lagging one of said signals and ending when it receives the lagging edge of the corresponding pulse in the leading one of said signals.

4. A circuit for detecting which of two out-of-phase signals is leading the other wherein said signals each comprise a series of digital pulses with each pulse in one of said signals being received concurrently with part of a corresponding pulse in the other of said signals, said circuit comprising:
   a. second circuit means for receiving said signals, said second circuit means being bistable for second periods of time after receiving the lagging edges of the pulses in the lagging one of said signals, the state of said second circuit means during said second periods being dependent on which of said signals is leading;
   b. means for receiving said signals and providing second timing pulses in response to the lagging edges of the pulses in the lagging one of said signals; and
   c. bistable circuit means connected to said second circuit means and adapted to receive said second timing pulses, said bistable circuit means being adapted to respond to the state of said second circuit means in response to each of said second timing pulses, whereby said bistable circuit means provides an output signal indicative of the state of said second circuit means during said second periods.

5. The circuit as recited in claim 4 wherein said second circuit means is bistable for each period beginning when it receives the lagging edge of one of the pulses in the lagging one of said signal and ending when it receives the leading edge of the next pulse received in either of said signals.

6. A circuit for detecting which of two out-of-phase signals is leading the other wherein said signals each comprise a series of digital pulses with each pulse in one of said signals being received concurrently with part of one of the pulses in the other of said signals, said circuit comprising:
   a. first circuit means for receiving said signals, said first circuit means being bistable for first periods of time after receiving the leading edges of the pulses in the lagging one of said signals, the state of said first circuit means during said first periods being dependent on which of said signals is leading;
   b. second circuit means for receiving said signals, said second circuit means being bistable for second periods of time after receiving the lagging edges of the pulses in the lagging one of said signals, the state of said second circuit means during said second periods being dependent on which of said signals is leading;
   c. means for receiving said signals and providing first timing pulses in response to the leading edges of the pulses in the lagging one of said signals;
   d. means for receiving said signals and providing second timing pulses in response to the lagging edges of the pulses in the lagging one of said signals; and
   e. bistable circuit means connected to said first and second circuit means and adapted to receive said first and second timing pulses, said bistable circuit means being adapted to respond to the state of said first circuit means in response to each of said first timing pulses, said bistable circuit means also being adapted to respond to the state of said second circuit means in response to each of said second timing pulses, whereby said bistable circuit means provides an output signal indicative of the state of said first circuit means during said first periods and of the state of said second circuit means during said second periods.

* * * * *